United States Patent [19]

Semura et al.

[11] Patent Number: 5,696,860
[45] Date of Patent: Dec. 9, 1997

[54] OPTICAL DEVICE MODULE AND METHOD FOR MANUFACTURING THE SAME

[75] Inventors: Shigeru Semura; Masahide Saito; Dai Yui; Shigeru Hirai; Shinji Ishikawa, all of Yokohama, Japan

[73] Assignee: Sumitomo Electric Industries, Ltd., Osaka, Japan

[21] Appl. No.: 365,145

[22] Filed: Dec. 28, 1994

[30] Foreign Application Priority Data

Dec. 28, 1993 [JP] Japan ................... 5-338445
Dec. 28, 1993 [JP] Japan ................... 5-338475

[51] Int. Cl.⁶ .......................................... G02B 6/30
[52] U.S. Cl. ................... 385/49; 385/50; 385/51
[58] Field of Search ................... 385/49, 51, 50, 385/94

[56] References Cited

U.S. PATENT DOCUMENTS

| 5,185,835 | 2/1993 | Vial et al. ................... 385/49 |
| 5,414,786 | 5/1995 | Ohta et al. ................... 385/63 |
| 5,430,821 | 7/1995 | Sasoka et al. ................... 385/99 |
| 5,444,804 | 8/1995 | Yui et al. ................... 385/49 |

FOREIGN PATENT DOCUMENTS

| 0422445 | 4/1991 | European Pat. Off. . |
| 0484011 | 5/1992 | European Pat. Off. . |
| 62-073210 | 4/1987 | Japan . |
| 0170102 | 6/1990 | Japan ................... 385/51 |
| 4204704 | 7/1992 | Japan . |
| 682652 | 3/1994 | Japan . |

OTHER PUBLICATIONS

Yanagihashi et al, "Packaging of Ti:LiNbO3 Optical Devices", Partial Translation of Article no/month no year.
Toyohara et al, "Packaging of Ti:LiNbO3 Optical Devices", Partial Translation of Article no month/no year.
Patent Abstracts of Japan, vol. 11, No. 274 (P-612) Sep. 5, 1987 & JP-A-62 073 209 (Mitsubishi).
Patent Abstracts of Japan, vol. 14, No. 269 (P-1059) Mar. 16, 1990 & JP-A-02 077 704 (Mitsubishi).

*Primary Examiner*—Phan T. H. Palmer
*Attorney, Agent, or Firm*—Cushman, Darby & Cushman IP Group of Pillsbury Madison & Sutro LLP

[57] ABSTRACT

An optical device module comprises a module body including an optical device, a first fiber connector holding a first optical fiber, coupled to one end of the optical device, and a second fiber connector holding a second optical fiber, coupled to the other end of the optical device; and an enclosure body integrally molded with a resin such as an epoxy resin, an urethan resin to coat the module body. Almost the whole module body is coated with the integrally molded epoxy resin, so that the module body is protected efficiently from external heat, moisture, mechanical shock etc.

8 Claims, 8 Drawing Sheets

OPTICAL DEVICE MODULE AND METHOD FOR MANUFACTURING THE SAME

BACKGROUND OF THE INVENTION

1. Field of the Invention

The present invention relates to an optical device module to be utilized in optical fiber communication networks and others, and to a method for manufacturing the optical device module.

2. Related Background Art

An optical device module comprises an optical device which is generally a waveguide substrate with an optical waveguide formed on a surface thereof, and fiber connectors coupled at both ends of the waveguide substrate, which are arranged so that each optical fiber supported with the fiber connector is optically coupled with the corresponding optical waveguide on the waveguide substrate. Here, the optical devices include a waveguide substrate itself, a waveguide substrate with various kinds of optical components, and a waveguide substrate the waveguide forming surface of which is covered with a resin or others.

In the optical device module, if the coupled portion between the waveguide substrate and the fiber connector is exposed to the ambient atmosphere, the adhesive strength of the adhesive in the coupled portion is degraded due to heat, moisture etc., which increases light loss and light reflection in an optical coupled portion. Moreover, if the coupled portion is exposed, the optical device module is weak against the mechanical shock.

As a countermeasure, conventionally, the waveguide substrate and the fiber connectors are stored in a housing, and a jelly-like resin is filled in the housing as a cushioning material. Such techniques disclosed in Japanese Patent Laid-Open No. HEI 5-27139 (27139/1993), Japanese Patent Laid-Open No. HEI 5-45531 (45531/1993) etc. are known.

However, in the above-described conventional technique, because the housing is a two-piece housing assembled with two identical half bodies, there is a possibility that the sealing between the half bodies may fail. As a result, the module may be influenced by external heat, moisture etc.

Further, in a case of the two-piece housing, it is hard to fill the jelly-like resin into the housing without any space left.

SUMMARY OF THE INVENTION

Thus, the object of the present invention is to provide an optical device module which is capable of protecting a module body efficiently from mechanical shock, heat, moisture etc. and a method for manufacturing such an optical device module.

To achieve the aforesaid object, the optical device module of the present invention comprises a module body including an optical device, a first fiber connector holding a first optical fiber, directly coupled to one end (e.g., a first end) of the optical device, and a second fiber connector holding a second optical fiber, directly coupled to the other end (e.g., a second end) of the optical device; and an enclosure body integrally molded with a first resin to enclose the whole module body.

In this optical device module, it is preferable that a second resin in the form of a gel such as a silicon resin, urethan resin is interposed between the enclosure body and the module body.

A method for manufacturing the optical device module with the above-described configuration of the present invention comprises a step of placing the module body into a mold of a molding device, a step of supporting the module body so that at least the first and second fiber connectors and a coupled portion between the fiber connectors and the optical device are separated from the surface of the inner wall of the mold, and a step of injecting the melting first resin into the mold in which the module body is placed and curing the resin to form the enclosure body.

To interpose the second resin between the enclosure body and the module body, before the module body is placed in the mold, the second resin in the form of a gel is applied onto the whole module body.

In the optical device module with the above-described configuration, almost the entire module body is coated with the integrally molded first resin, so that the module body is protected efficiently from external heat, moisture, mechanical shock etc. Especially, as the second resin in the form of a gel is interposed between the enclosure body and the module body, the gel-like resin functions as a cushioning material and accepts movement of the fiber connectors due to thermal expansion or thermal shrinkage of the adhesives between the fiber connectors and the optical device.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The preferred embodiments of the present invention will be described in detail with reference to the drawings hereinbelow. In the following description, like references characters designate like or corresponding parts throughout the several views.

Figure 1:
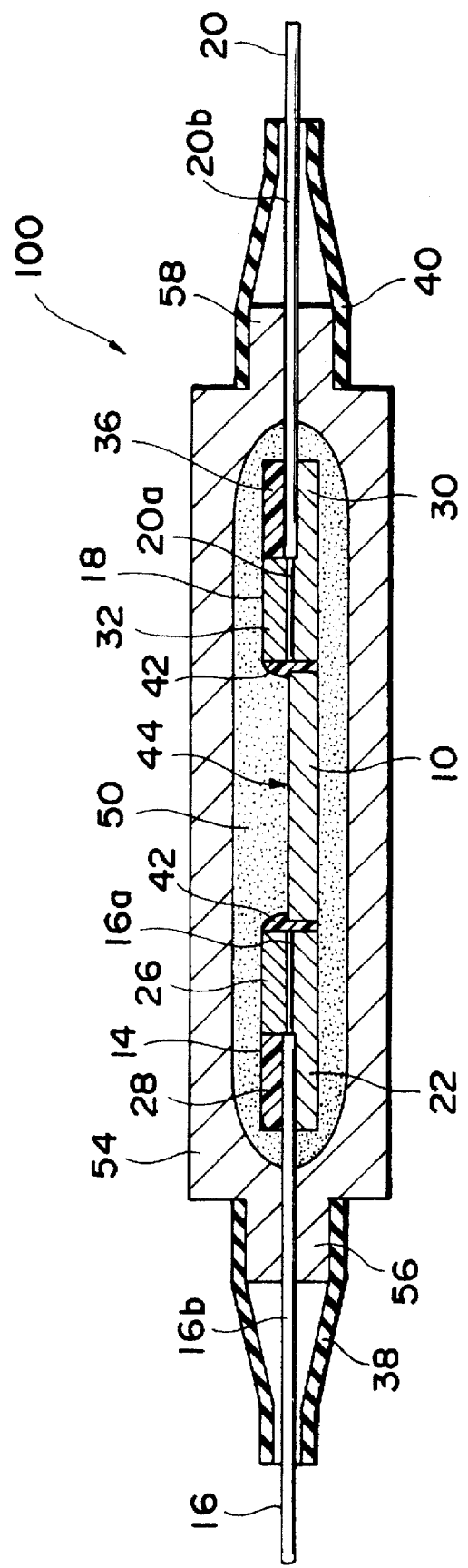
FIG. 1 is a sectional view showing an optical device module according to the first embodiment of the present invention.

FIG. 1 is a sectional view of an optical device module 100 of the first embodiment. FIGS. 2 to 5 show a manufacturing process of the optical device module 100 in FIG. 1. As the process is being described, the configuration of the optical device module will be apparent. In the drawings, the reference numeral 10 designates a waveguide substrate which is an optical device in the optical device module 100 and in which a 1×4-branch optical waveguide 12 is formed on the surface thereof. In general, such a waveguide substrate 10 is formed using a method for depositing fine particles of $SiO_2$ on a surface of a silicon substrate by frame hydrolysis (FHD: flame hydrolysis deposition method).

To end faces of the waveguide substrate 10 where the end faces of the optical waveguide 12 are located respectively, a first fiber connector 14 for holding one end of a first optical fiber 16 and a second fiber connector 18 for holding one end of a second optical fiber 20 are adhered respectively.

The first optical fiber 16 comprises a bare fiber 16a, a primary coating (not shown), e.g. of a silicon resin, coated on the bare fiber 16a, and a secondary coating 16b, e.g. of a nylon, coated on the primary coating. As clearly shown in FIG. 2, the first fiber connector 14 comprises a V-shaped-groove substrate 22 with one V-shaped groove 24 formed on the surface thereof, and a holding plate 26 to be adhered on the surface of the V-shaped-groove substrate 22. One end of the optical fiber 16 with the exposed bare fiber 16a is set in the V-shaped groove 24 of the V-shaped-groove substrate 22. Then, the holding plate 26 is adhered on the V-shaped-groove substrate 22 with an adhesive 28, by which the optical fiber 16 is held with the optical fiber connector 14.

The second optical fiber 20 is called a tape fiber optic cable or a ribbon fiber optic cable. The optical fiber 20 has a plurality of primarily coated bare fibers 20a (four in this embodiment) which are arranged parallel to one another and secondarily coated, e.g., by the nylon 20b to be bundled flatly. The second fiber connector 18, as similar to the first fiber connector 14, comprises a V-shaped-groove substrate 30 and a holding plate 32. There are four V-shaped grooves 34 parallel to one another formed on the surface of the V-shaped-groove substrate 30. The ends of the exposed bare fibers 20a of the optical fiber 20 are set in the respective V-shaped grooves 34. Then, the holding plate 32 is adhered on the V-shaped-groove substrate 30 with an adhesive 36, by which the second optical fiber 20 is held with the second fiber connector 18.

Figure 2:
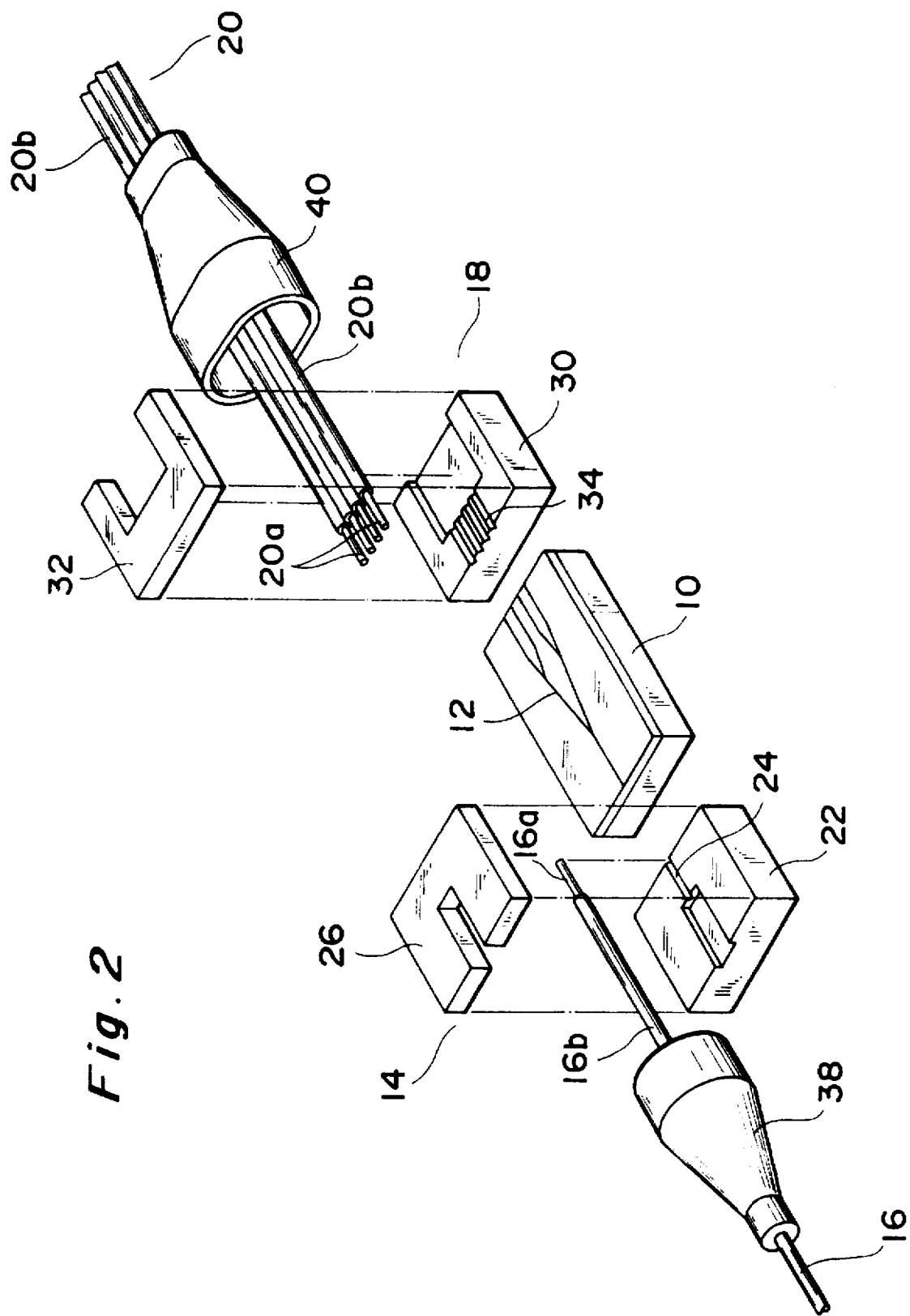
FIG. 2 is a view showing a manufacturing process of the optical device module in FIG. 1, which is an exploded perspective view of a module body.
Figure 3:
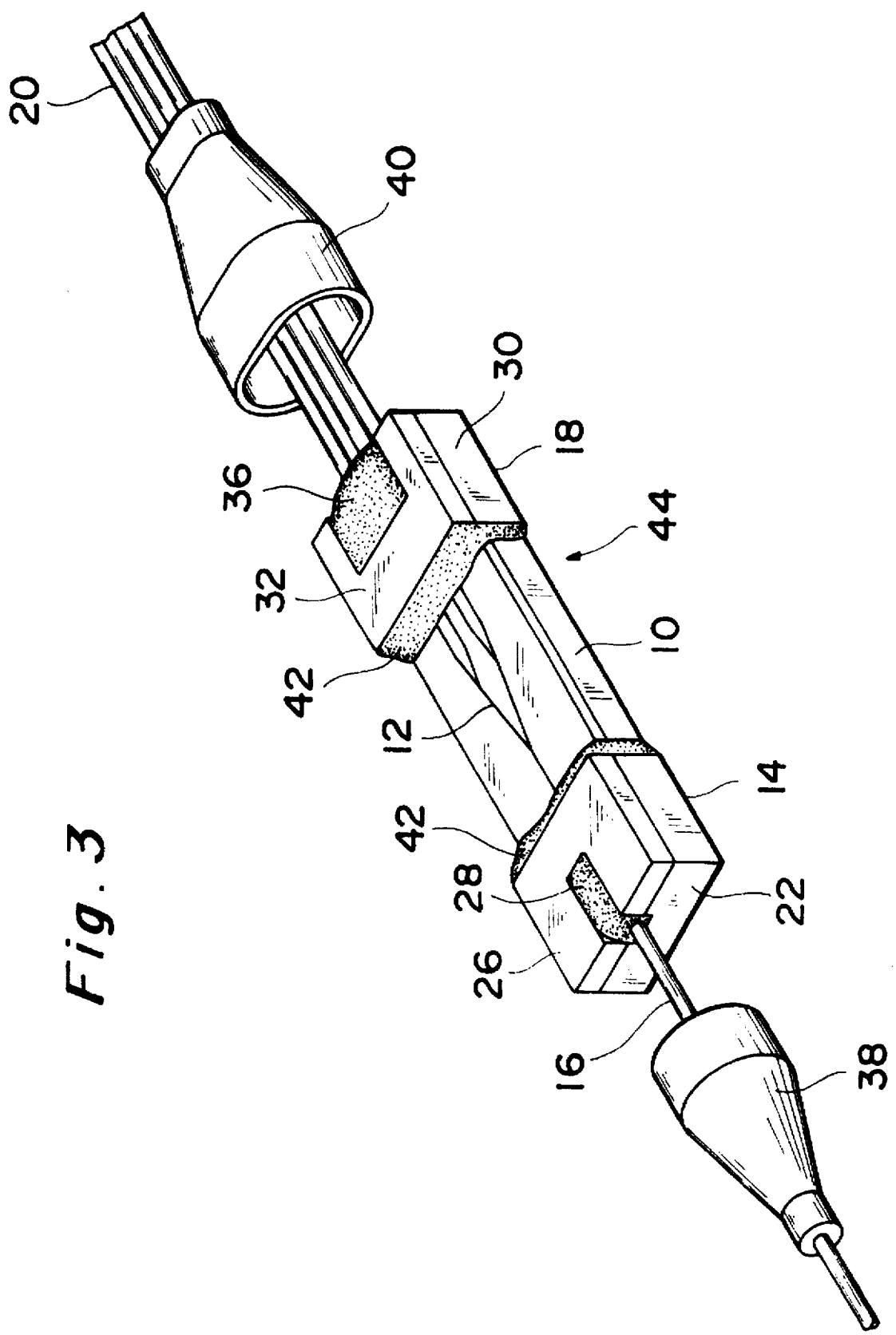
FIG. 3 is a view showing a manufacturing process of the optical device module in FIG. 1, which is a perspective view showing a completed module body.

It should be noted that as shown in FIG. 2 and FIG. 3, before the fiber connectors 14, 18 are coupled to the optical fibers 16, 20, it is preferable that rubber protecting boots 38, 40 which are fitted on the completed product be put on the optical fibers 16, 20 beforehand, respectively. Further, the V-shaped-groove substrates 22, 30 may be formed, e.g., by grinding or etching a silicon substrate.

Next, as shown in FIG. 3, the first and second fiber connectors 14, 18 are adhered on the respective end faces of the waveguide substrate 10 with an adhesive, preferably an ultra violet ray curing adhesive 42. At this point, the first and second fiber connectors 14, 18 are positioned in respect to the waveguide substrate 10 so that the end face of each bare fibers 16a, 20a of the optical fiber 16, 20 is optically coupled with the respective end face of the optical waveguide 12.

Figure 4:
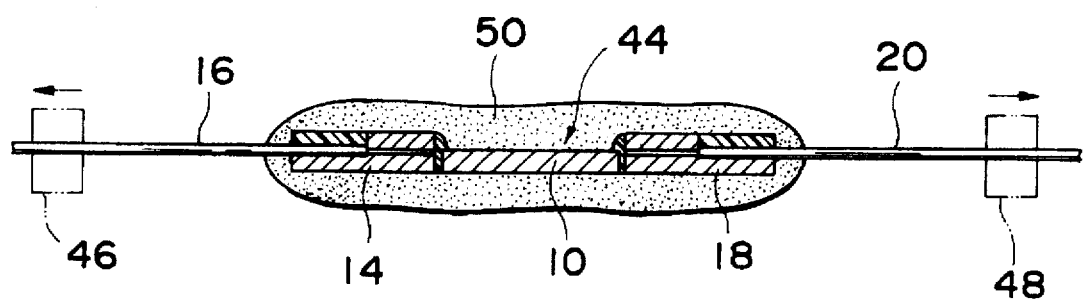
FIG. 4 is a view showing a manufacturing process of the optical device module in FIG. 1, which shows the module body being suspended like a bridge.

After a module body 44 comprising the waveguide substrate 10 and the fiber connectors 14, 18 are formed in the above-described manner, as shown in FIG. 4, the proper portions of the first and second optical fibers 16, 20 are clamped by support devices or clamps 46, 48, respectively. Then, one or both of the clamps 46, 48 are moved so that one clamp 46 or 48 is apart from the other clamp 48 or 46. Consequently, a certain tensile force acts on the optical fibers 16, 20, and the module body 44 is suspended between the clamp members 46, 48, like a bridge.

Thereafter, a gel-like or jelly-like resin 50 having a proper viscosity is applied onto the whole module body 44 without any space left. The resin 50 must be fluid so that it can be applied on the module body 44 and must have the proper stickiness or adhesion after application so that it does not drop from the module body 44. Moreover, the resin 50 preferably is heat resistant and moisture resistant. As this sort of resin 50, a silicon resin (e.g., trade name: Silicone Gel product of Sin-Etsu Corp.) or a urethane resin (e.g., trade name: PEL-URETHANE product of Nippon Pelnox Corp.) can be used.

Figure 5:
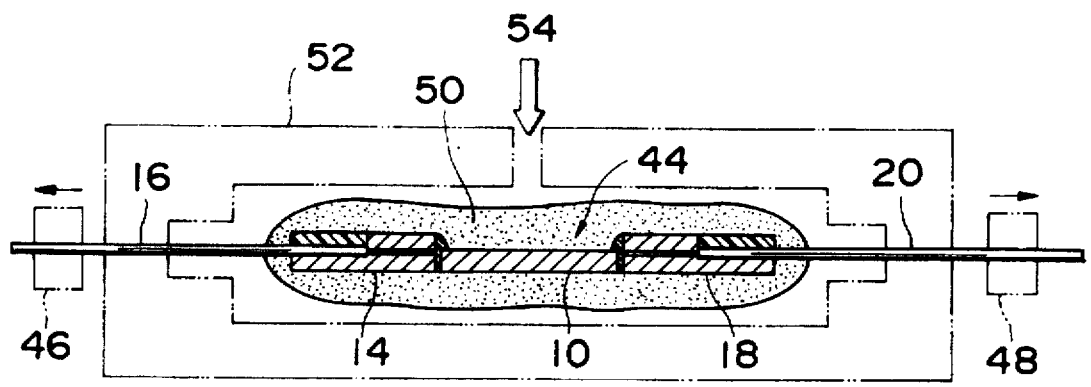
FIG. 5 is a view showing a manufacturing process of the optical device module in FIG. 1, which shows the module body being placed in a mold of a molding device.

Next, as shown in FIG. 5, the module body 44 on which the resin 50 is applied is placed in a mold 52 of a molding device while being suspended between the clamps 46, 48. At this point, the module body 44 is placed substantially in the center of the space of the mold 52 and spaced apart from the inner wall surface of the mold 52. Thereafter, a proper resin 54 is injected into the mold 52 and cured. The resin 54 must form a certain shape after cured, and must be heat resistant and moisture resistant. As this sort of resin 54, a thermosetting epoxy resin (e.g., trade name: EPOTECH product of Epoxy Technology Corp.) is preferable. When this thermosetting epoxy resin is used, it is effective that the module is molded in accordance with the transfer molding. Alternatively, an ultra violet ray curing resin (e.g., trade name: OPTO-DAINE product of DAIKIN Corp.), a silicon resin (e.g., trade name:Silicone Gel product of Sin-Etsu Corp.), or a urethane resin (e.g., trade name: PEL-URETHANE product of Nippon Pelnox Corp.) etc. can be used.

After the resin 54 is cured, the mold 52 is removed and the clamp members 46, 48 are removed from the optical fibers 16, 20. There are boot attaching portions 56, 58 (FIG. 1) to which the aforesaid protecting boots 38, 40 are attached and which are formed at both ends of the cured resin 54, that is, an enclosure body 54. When the protecting boots 38, 40 are fitted on the boot attaching portions 56, 58, the optical device module 100 shown in FIG. 1 is completed.

In the optical device module 100 formed in this manner, the enclosure body 54 surrounding the module body 44 is molded with the epoxy resin or the like, so that the shape of the outer appearance is constant. Moreover, since the module body 44 is surrounded by the molded resin 54, the module body 44 is completely sealed from the external environment. Therefore, the module body 44 is protected efficiently from external heat, moisture, mechanical shock etc. Further, since the gel-like resin 50 is interposed between the module body 44 and the enclosure body 54, the module body 44 is protected from the external environment by the resin 50.

The module body 44 is immersed in the gel-like resin 50, and then floated and supported inside the enclosure body 54. Since the resin 50 has the proper viscosity, if a mechanical shock is applied to the optical device module 100 from the outside, the shock is absorbed by the gel-like resin 50. Therefore, the gel-like resin 50 functions as a cushioning material. Moreover, even though heat is applied to the optical device module 100 and the adhesive 42 in the coupled portion of the module body 44 thermally expands or thermally shrinks, the gel-like resin 50 can accommodate the movement of the fiber connectors 14, 18.

Figure 6:
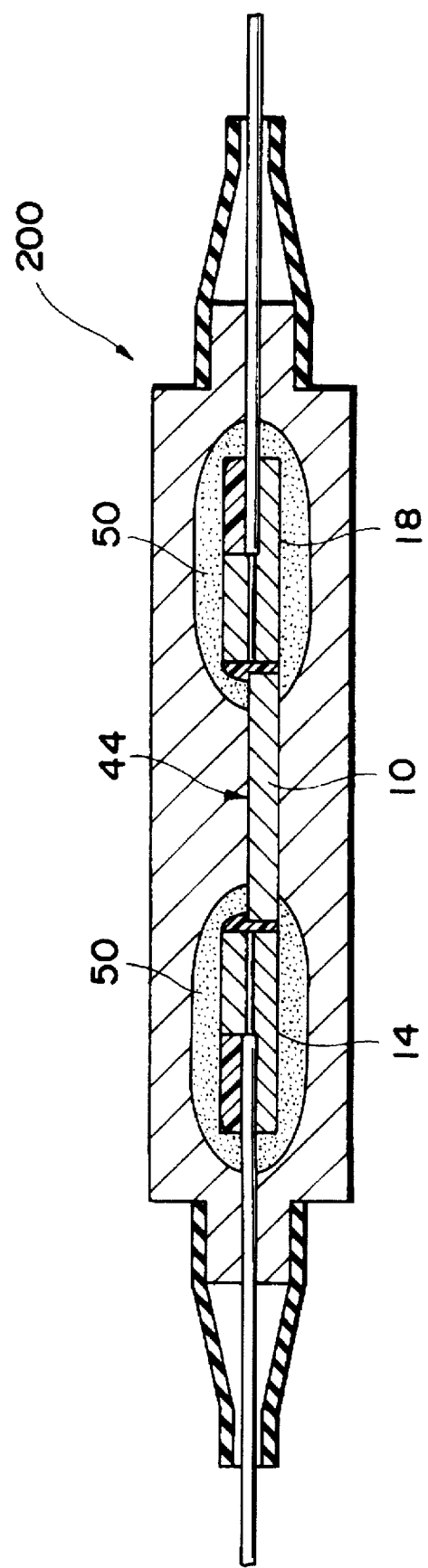
FIG. 6 is a sectional view showing an optical device module according to the second embodiment of the present invention.

There is shown in FIG. 6 an optical device module 200 formed in accordance with the second embodiment of the present invention. The optical device module 200 of the second embodiment is different from the optical device module of the first embodiment in that the gel-like resin 50 is not applied onto the whole module body 44. In this case, the gel-like resin 50 is applied onto the whole first and second fiber connectors and portions of the waveguide substrate 10 adjacent to these fiber connectors 14, 18. Since mechanical shock, heat and moisture mainly influences the coupled portions between the fiber connectors 14, 18 and the waveguide substrate 10, if at least these parts are protected by the gel-like resin 50, the same effect as in the first embodiment will be attained.

Figure 7:
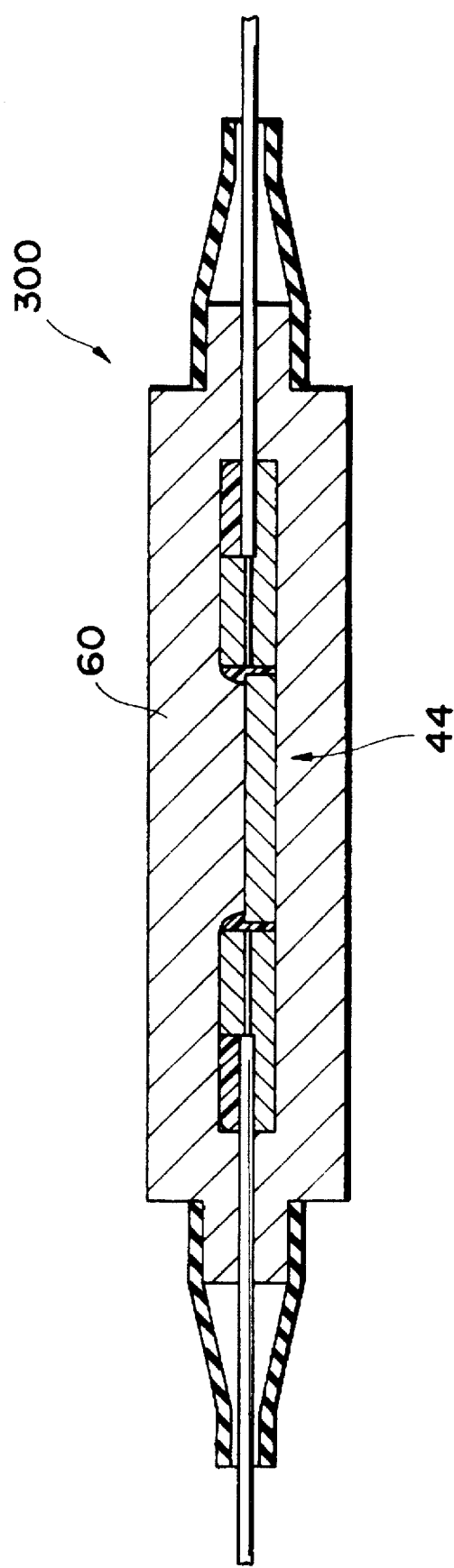
FIG. 7 is a sectional view showing an optical device module according to the third embodiment of the present invention.

When the urethan resin is used as the gel-like resin 50, it can be used in the form of a gel. But, because the cured urethan resin is superior in elasticity, it can be used as a cushioning material. For this reason, like an optical device module 300 shown in FIG. 7, an enclosure body 60 made of urethan resin is directly formed around the module body 44.

Figure 8:
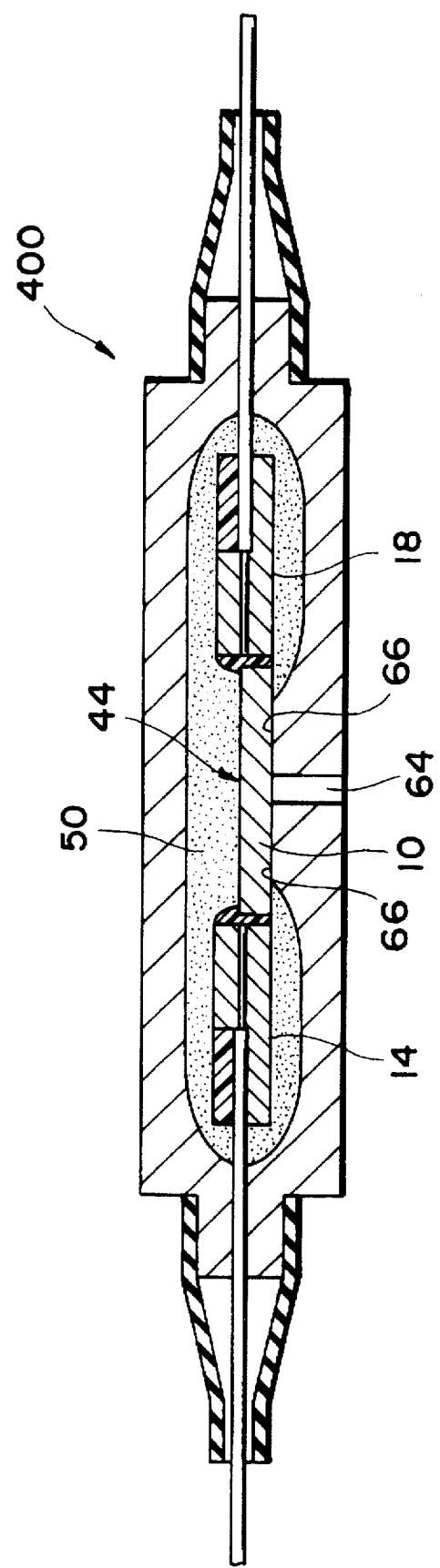
FIG. 8 is a sectional view showing an optical device module according to the fourth embodiment of the present invention.

FIG. 8 shows an optical device module 400 formed in accordance with the fourth embodiment of the present invention. In the case of forming the optical device module 100 of the first embodiment, the module body 44 is supported and suspended by the clamps 44, 46. However, in the case of the optical device module 400 of the fourth embodiment, without using the clamps, the bottom surface of the waveguide substrate 10 in the module body 44 is supported by at least one support rod.

Figure 9:
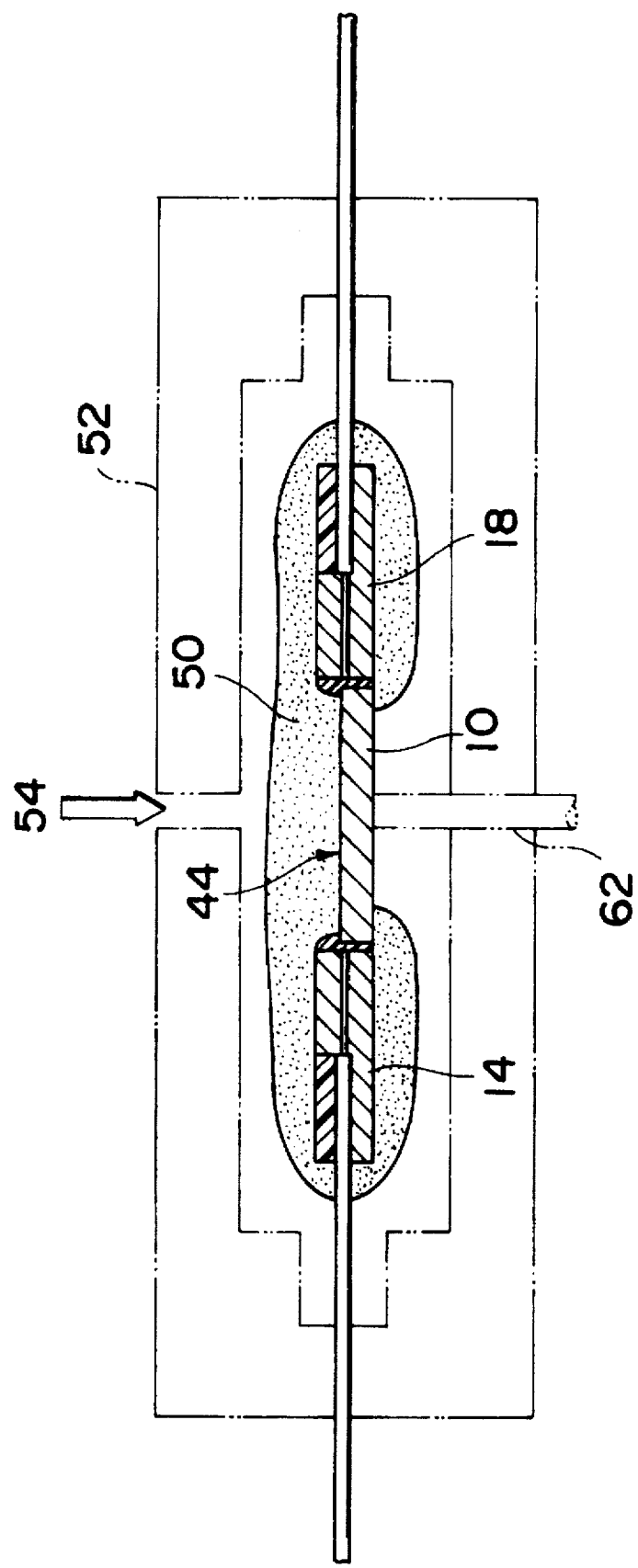
FIG. 9 is a view showing a manufacturing process of the optical device module in FIG. 8, which shows a module body being supported with a support rod in a mold of a molding device.

In detail, after the first and second fiber connectors 14, 18 are coupled to the waveguide substrate 10, the gel-like resin 50 is applied onto the module body 44 except on the center portion of the bottom surface of the waveguide substrate 10. Thereafter, as shown in FIG. 9, the center portion of the waveguide substrate 10 rests on an upper end face of a support rod 62 projecting from the bottom surface of mold 52 of the molding device. Then, melting resin 54 such as epoxy resin is injected into the mold 52 and cured. An optical device module 400 formed in the manner is shown in FIG. 8. In FIG. 8, a hole denoted by the numeral 64 is formed when the support rod 62 is removed. This hole 64 can be utilized in the various measurement, for example, the measurement of internal temperature of the optical device module 400. It should be noted that since a portion 66 of the enclosure body 54 surrounding the upper end of the hole 64 is tightly in contact with the bottom surface of the waveguide substrate 10, water and other substances do not enter through the hole 64 and never reach the fiber connectors 14, 18.

The preferred embodiments of the present invention have been described in detail but the present invention is not limited to the above embodiments. For example, the resin composing the enclosure body of the optical device module and the gel-like resin are not limited to the above-described ones but any suitable resins can be used. Further, the optical device may be the one that an optical component is placed onto the optical waveguide forming surface of the waveguide substrate.

As described above, according to the present invention, almost the entire module body is coated with the integrally molded resin such as epoxy resin, so that the module body is protected efficiently from external heat, moisture, mechanical shock etc. Even though the adhesives between the fiber connectors and the optical device thermally expand or thermally contract, the gel-like resin accepts the movement of the fiber connectors. Therefore, excess force does not act on the module body.

According to the method of the present invention, after the gel-like resin is applied onto the module body, the enclosure body is formed, e.g., in accordance with the transfer molding method. Therefore, the module body is resiliently immersed in the gel-like resin without any space left.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application Nos.338445/1993 filed on Dec. 28, 1993 and 338475/1993 filed on Dec. 28, 1993 are hereby incorporated by reference.

What is claimed is:

1. An optical device module comprising:

a module body including an optical device having first and second ends, a first fiber connector holding a first optical fiber, said first optical fiber being directly coupled to said first end of said optical device, and a second fiber connector holding a second optical fiber, said second optical fiber being directly coupled to said second end of said optical device;

an enclosure body made of a first resin, said enclosure body integrally enclosing the whole of said module body; and a second resin in the form of a gel interposed between said module body and said enclosure body, wherein said optical device is a waveguide substrate with an optical waveguide formed on a surface thereof.

2. An optical device module according to claim 1, wherein said enclosure body is an integrally molded article.

3. An optical device module according to claim 2, wherein said first and second fiber connectors are surrounded by said second resin, and further wherein coupled portions between said optical fiber connectors and said optical device are surrounded by said second resin.

4. An optical device module according to claim 1, wherein said second resin is a silicon resin.

5. An optical device module according to claim 1, wherein said second resin is an urethane resin.

6. An optical device module according to claim 1, wherein said first resin is an epoxy resin.

7. An optical device module according to claim 1, wherein said first resin is an urethane resin.

8. An optical device module according to claim 1, wherein said first and second fiber connectors are coupled to said optical device with an adhesive.

* * * * *